US008823610B2

(12) United States Patent
Miyazawa

(10) Patent No.: US 8,823,610 B2
(45) Date of Patent: Sep. 2, 2014

(54) ELECTRONIC CIRCUIT, METHOD OF DRIVING THE SAME, ELECTRONIC DEVICE, ELECTRO-OPTICAL DEVICE, ELECTRONIC APPARATUS, AND METHOD OF DRIVING THE ELECTRONIC DEVICE

(75) Inventor: Takashi Miyazawa, Suwa (JP)

(73) Assignee: Seiko Espon Corporation, Tokyo (JP)

( * ) Notice: Subject to any disclaimer, the term of this patent is extended or adjusted under 35 U.S.C. 154(b) by 591 days.

(21) Appl. No.: 12/896,629

(22) Filed: Oct. 1, 2010

(65) Prior Publication Data

US 2011/0018855 A1 Jan. 27, 2011

Related U.S. Application Data

(63) Continuation of application No. 10/921,951, filed on Aug. 20, 2004, now abandoned.

(30) Foreign Application Priority Data

Aug. 29, 2003 (JP) ................................ 2003-306804
Jun. 29, 2004 (JP) ................................ 2004-191357

(51) Int. Cl.
*G06F 3/038* (2013.01)
*G09G 3/32* (2006.01)

(52) U.S. Cl.
CPC ...... *G09G 3/3233* (2013.01); *G09G 2300/0866* (2013.01); *G09G 2310/0262* (2013.01); *G09G 2310/0251* (2013.01); *G09G 2300/0819* (2013.01); *G09G 2320/043* (2013.01); *G09G 3/3291* (2013.01); *G09G 2300/0852* (2013.01); *G09G 2310/0256* (2013.01); *G09G 2310/0254* (2013.01)
USPC .................. 345/76; 345/77; 345/78; 345/79; 345/80; 315/169.1; 315/169.2; 315/169.3; 315/169.4

(58) Field of Classification Search
USPC ................................. 345/76, 204; 315/169.1
See application file for complete search history.

(56) References Cited

U.S. PATENT DOCUMENTS 6,100,860 A * 8/2000 Takayama et al. .............. 345/76
6,229,506 B1 * 5/2001 Dawson et al. ................. 345/82

(Continued)

FOREIGN PATENT DOCUMENTS

JP A-8-305832 11/1996
JP A-2003-029707 1/2003

(Continued)

OTHER PUBLICATIONS

Tsujimura et al., "A 20-inch OLED Display Driven by Super-Amorphous-Silicon Technology", *SID 03 Digest*, 2003, pp. 6-9.

(Continued)

*Primary Examiner* — Grant Sitta
(74) *Attorney, Agent, or Firm* — Oliff PLC

(57) ABSTRACT

A gate of a driving transistor is set to a offset level corresponding to the threshold of the driving transistor by an initializing current flowing between a source and a drain of the driving transistor or a compensating transistor for the driving transistor. A conduction state of the driving transistor is set according to a gate voltage of the gate of the driving transistor that corresponds to a data signal and the threshold of the driving transistor. A current of which a level corresponds to the conduction state and of which the direction is opposite to the direction of the initializing current flows through driving transistor.

16 Claims, 11 Drawing Sheets

(56) References Cited

U.S. PATENT DOCUMENTS

| | | | |
|---|---|---|---|
| 6,529,178 | B1 | 3/2003 | Kimura |
| 6,750,833 | B2 | 6/2004 | Kasai |
| 6,841,948 | B2 * | 1/2005 | Yoshida ..................... 315/169.3 |
| 6,864,863 | B2 | 3/2005 | Kasai |
| 6,958,750 | B2 | 10/2005 | Azami et al. |
| 7,199,768 | B2 | 4/2007 | Ono et al. |
| 7,649,516 | B2 | 1/2010 | Azami et al. |
| 2002/0047839 | A1 * | 4/2002 | Kasai ............................ 345/211 |
| 2002/0135309 | A1 | 9/2002 | Okuda |
| 2002/0196213 | A1 | 12/2002 | Akimoto et al. |
| 2003/0020705 | A1 | 1/2003 | Kondo et al. |
| 2003/0052614 | A1 | 3/2003 | Howard |
| 2003/0095087 | A1 | 5/2003 | Libsch et al. |
| 2004/0080882 | A1 | 4/2004 | Miyazawa |
| 2004/0095298 | A1 | 5/2004 | Miyazawa |
| 2004/0095338 | A1 | 5/2004 | Miyazawa |
| 2004/0100427 | A1 | 5/2004 | Miyazawa |
| 2005/0007318 | A1 | 1/2005 | Kasai et al. |
| 2005/0156829 | A1 | 7/2005 | Choi et al. |

FOREIGN PATENT DOCUMENTS

| | | |
|---|---|---|
| JP | A-2003-186436 | 7/2003 |
| JP | A-2003-295824 | 10/2003 |
| JP | A-2004-007572 | 1/2004 |
| JP | A-2004-70074 | 3/2004 |
| JP | A-2004-145278 | 5/2004 |
| WO | WO 98/48403 A | 10/1998 |

OTHER PUBLICATIONS

Sanford et al., "TFT AMOLED Pixel Circuits and Driving Methods", *SID 03 Digest*, 2003, pp. 10-13.

4.2 TFT AMOLED Pixel Circuits and Driving Methods, James L. Sanford and Frank R. Libsch SID Symposium Digest of Technical Papers-May 2003.

Sanford J. L. et al., "4.2: TFT AMOLED Pixel Circuits and Driving Methods," 2003 SID International Symposium Digest of Technical Papers, May 20, 2003, pp. 10-13, 03 Digest, XP-001171706.

Jun. 22, 2011 Office Action issued in European Patent Application No. 04020280.6.

* cited by examiner

ELECTRONIC CIRCUIT, METHOD OF DRIVING THE SAME, ELECTRONIC DEVICE, ELECTRO-OPTICAL DEVICE, ELECTRONIC APPARATUS, AND METHOD OF DRIVING THE ELECTRONIC DEVICE

This is a Continuation of application Ser. No. 10/921,951 filed Aug. 20, 2004. The disclosure of the prior application is hereby incorporated by reference herein in its entirety.

BACKGROUND OF THE INVENTION

1. Field of Invention

The present invention relates to an electronic circuit suitable for driving a driven element such as an electro-optical element, a method of driving the electronic circuit, an electro-optical device, an electronic device, a method of driving the electronic device, and an electronic apparatus.

2. Description of Related Art

Recently, displays using an organic electroluminescent (EL) element have been drawing attention. The organic EL element is one of the current-driven elements whose brightness is set according to a driving current flowing therethrough. In an active matrix driving mode, in order to accurately obtain the brightness, it is necessary to compensate the different characteristics of transistors constituting pixel circuits. As a method of compensating the different characteristics, a voltage programmed mode and a current programmed mode have been suggested.

Moreover, in Japanese Unexamined Patent Application Publication No. 2002-255251, which is earlier filed by the present applicants, a compensation method of Vth is disclosed.

SUMMARY OF THE INVENTION

It is an object of the present invention to provide a novel electronic device capable of compensating characteristics of transistors.

Further, it is another object of the present invention to enhance the flexibility of operational design by compensating Vth compensation and by applying a reverse bias in one operation process in such an electronic device.

A first method of driving an electronic circuit according to an aspect of the present invention, the method including a first step of generating a potential difference between a first terminal and a second terminal of a driving transistor having a channel region arranged between the first terminal and the second terminal, such that the first terminal functions as a drain of the driving transistor, in a state in which a gate and the first terminal of the driving transistor are electrically coupled to each other; and a second step of supplying a driven element with a driving voltage and/or a driving current according to a conduction state of the driving transistor which is set by supplying the gate of the driving transistor with a data signal, such that the second terminal functions as the drain of the driving transistor.

In the above-mentioned method of driving the electronic device, a relative potential relation between the first terminal and the second terminal is changed according to steps. However, since a forward bias and a reverse bias (or a non-forward bias) are applied to the driving transistor, it is possible to suppress change or deterioration in characteristic of the driving transistor.

Here, the term 'drain' is defined by a conduction type and a relative potential relation of terminals of a transistor. For example, if the transistor is a n-type, a high potential terminal of two terminals with the channel region interposed therebetween becomes a 'drain'. Meanwhile, if the transistor is a p-type, a low potential terminal of two terminals with the channel region interposed therebetween, becomes a 'drain'.

In the above-mentioned method of driving an electronic device, after generating the potential difference, an initializing current may flow between the first terminal and the second terminal, and the gate voltage of the driving transistor may be set to an offset level according to the threshold value of the driving transistor.

Here, the term 'after generating the potential difference' means that the generation of the potential difference is performed as an initial operation, and a process of setting the offset level may be performed after generating the potential difference or during generating the potential difference.

In the above-mentioned method of driving an electronic device, the electronic device may comprise a capacitor having a first electrode and a second electrode with a capacitance formed therebetween, in which the gate is coupled to the first electrode, and after generating the potential difference, the conduction state may be set by making the gate so as to be in a floating state and by supplying the gate with the data signal by means of capacitive coupling via the capacitor.

In the above-mentioned method of driving an electronic device, during at least a part of the period in which supply of the driving voltage and/or driving current is performed, the first terminal and the gate of the driving transistor may be electrically disconnected from each other.

Here, the term 'electrically disconnected' means that a conduction state between the first terminal and the gate is removed, and a capacitor may be interposed between the first terminal and the gate.

In the above-mentioned method of driving an electronic device, the driven element may include an operating electrode coupled to the first terminal, a counter electrode, and a functional layer arranged between the operating electrode and the counter electrode, and during at least a period in which the generation of the potential difference and the supply of the driving voltage and/or driving current are performed, the voltage of at least the counter electrode may be fixed to a predetermined voltage level.

In the above-mentioned method of driving an electronic device, during at least a part of a period in which the generation of the potential difference is performed, the voltage of the second terminal may be set to be lower than the predetermined voltage level. Thus, it is possible to apply a non-forward bias to, for example, the driving transistor or the driven element.

The above-mentioned method of driving an electronic device may further including setting a voltage level of the first terminal to a level lower than the predetermined voltage level, and during a period in which the setting of the voltage level is performed, a voltage of the counter electrode may be fixed to the predetermined voltage level. Thus, it is possible to apply a non-forward bias to, for example, the driven element.

There is a method of driving an electronic device according to another aspect of the present invention, the electronic circuit includes a driving transistor having a first terminal, a second terminal, and a channel region arranged between the first terminal and the second terminal, and a compensating transistor having a third terminal, a fourth terminal, and a channel region arranged between the third terminal and the fourth terminal, in which its gate and the third terminal are coupled to each other.

The method includes generating a potential difference between the third terminal and the fourth terminal, such that the third terminal functions as a drain of the compensating transistor, and supplying a driven element with a driving voltage and/or a driving current according to a conduction state of the driving transistor which is set by supplying the gate of the driving transistor with a data signal, wherein the voltage level of the fourth terminal during at least a part of the period in which the supply of the driving voltage and/or driving current is performed is set to be different from the voltage level of the third terminal during at least a part of a period in which the generation of potential difference is performed.

In the above-mentioned method of driving an electronic device, after generating the potential difference, an initializing current may flow between the third terminal and the fourth terminal, and the gate of the driving transistor may be set to an offset level according to the threshold value of the compensating transistor.

Here, the initializing current may flow during the generation of the potential difference is performed as an initial operation, and a process of setting the offset level may be performed after generating the potential difference or during generating the potential difference.

In the above-mentioned method of driving an electronic device, during at least a part of the period in which the supply of the driving voltage and/or the driving current is performed, the third terminal and the fourth terminal may be substantially electrically disconnected from each other. Thus, it is possible to make the gate of the driving transistor in a floating state, and it is also possible to maintain the gate voltage of the gate at a voltage level according to the data signal.

In the above-mentioned method of driving an electronic device, preferably, during at least a part of the period in which the generation of the potential difference is performed, the voltage level of the first terminal is set to be higher than the voltage level of the second terminal, and during at least a part of the period in which the supply of the driving voltage and/or the driving current is performed, the voltage level of the second terminal is set to be higher than the voltage level of the first terminal.

In the above-mentioned method of driving an electronic device, the driven element may comprise an operating electrode coupled to the first terminal, a counter electrode, and a functional layer arranged between the operating electrode and the counter electrode, and during at least a period in which the generation of the potential difference and the supply of the driving voltage and/or the driving current are performed, the voltage level of the counter electrode may be fixed to a predetermined voltage level.

In the above-mentioned method of driving an electronic circuit, during at least a part of the period in which the generation of the potential difference is performed, the voltage level of the second terminal is preferably set to be lower than the predetermined voltage level.

Preferably, the above-mentioned method of driving an electronic circuit further includes setting the voltage level of the first terminal to a voltage level lower than the predetermined voltage level, and during the period in which the setting of the voltage level is performed, the voltage of the counter electrode is fixed to the predetermined voltage level.

In the above-mentioned method of driving an electronic circuit, the voltage level of the fourth terminal may be set to be the same voltage level as the second terminal in the generation of the potential difference and the supply of the driving voltage and/or the driving current.

There is an electronic circuit that drives a driven element according to another aspect of the present invention, the electronic circuit includes a driving transistor having a first terminal, a second terminal and a channel region arranged between the first terminal and the second terminal; a first capacitor having a first electrode and a second electrode with a capacitance formed therebetween; and a first transistor arranged between the first terminal and a gate of the driving transistor to control the electrical coupling between the first terminal and the gate, wherein the first electrode is coupled to the gate, and the second electrode is coupled to the first terminal.

The above-mentioned electronic circuit may further include a second capacitor having a third electrode and a fourth electrode with a capacitance formed therebetween, and a second transistor having a third terminal, a fourth terminal and a channel region arranged between the third terminal and the fourth terminal, in which the gate of the driving transistor may be coupled to the third electrode, and the third terminal may be coupled to the fourth electrode.

In the above-mentioned electronic circuit, during at least a part of a first period in which the first terminal and the gate of the driving transistor are electrically coupled to each other via the first transistor, a voltage level of the first terminal and/or the second terminal may be set such that the first terminal functions as a drain of the driving transistor, and during at least a part of a second period in which the first terminal and the gate of the driving transistor are electrically disconnected from each other, the voltage level of the first terminal and/or the second terminal may be set such that the second terminal functions as a drain of the driving transistor.

There is an electronic circuit that drives a driven element according to another aspect of the present invention, the electronic circuit includes a driving transistor having a first terminal, a second terminal and a channel region arranged between the first terminal and the second terminal, and a first transistor arranged between the first terminal and a gate of the driving transistor to control the electrical coupling between the first terminal and the gate, wherein during at least a part of a first period in which the first terminal and the gate of the driving transistor are electrically coupled to each other via the first transistor, the voltage level of the first terminal and/or the second terminal is set such that the first terminal functions as a drain of the driving transistor, and during at least a part of a second period in which the first terminal and the gate of the driving transistor are electrically disconnected from each other, the voltage level of the first terminal and/or the second terminal is set such that the second terminal functions as a drain of the driving transistor.

In the above-mentioned electronic circuit, after the first period, the voltage level of the gate of the driving transistor may be set to an offset voltage level according to the threshold voltage of the driving transistor, and during at least a part of the second period, a driving voltage or a driving current of which a level corresponds to the conduction state of the driving transistor may be supplied to the driven element.

Here, a process of setting the offset level may be performed after the first period or during the first period.

There is provided an electronic circuit that drives a driven element according to another aspect of the present invention, the electronic circuit includes a driving transistor having a first terminal, a second terminal and a channel region arranged between the first terminal and the second terminal; and a compensating transistor a third terminal, a fourth terminal and a channel region arranged between the third terminal and the fourth terminal, in which the third terminal and its gate are coupled to each other, wherein the third terminal or the fourth terminal is coupled to the gate of the driving transistor, and voltages of the third terminal and the fourth terminal are respectively settable to a plurality of voltage levels.

In the above-mentioned electronic circuit, during the first period, a voltage level of the third terminal and/or the fourth terminal may be set such that the third terminal functions as a drain of the compensating transistor, during the second period, the voltage level of the third terminal and/or the fourth terminal may be set such that the third terminal and the fourth terminal are electrically disconnected from each other, during at least a part of the second period, a driving voltage or a driving current of which a level corresponds to a conduction state of the driving transistor may be supplied to the driven element, and the voltage level of the fourth terminal during the first period and the voltage level of the fourth terminal during the second period may be to be different from each other.

Preferably, the above-mentioned electronic circuit further includes a capacitor having a first electrode and a second electrode with a capacitance formed therebetween, in which the first electrode is coupled to the gate of the driving transistor, and after the first period, an initializing current flows between the third terminal and the fourth terminal of the compensating transistor, such that the voltage level of the gate of the driving transistor is set to an offset level according to the threshold voltage of the compensating transistor, and then by means of capacitive coupling via the capacitor to be generated when a data voltage corresponding to the data signal is applied to the second electrode, the gate of the driving transistor is set to a voltage level corresponding to the data voltage on the basis of the offset level, such that the conduction state is set.

In the above-mentioned electronic circuit, the voltage level of the fourth terminal or the third terminal is preferably set to the same voltage level as the voltage level of the second terminal during the first and second periods.

There is provided an electronic device includes a plurality of electronic circuits described above, and driven elements provided in the corresponding electronic circuits.

There is provided an electro-optical device according to another aspect of the present invention, the electro-optical device includes a plurality of data lines, a plurality of scanning lines, a plurality of first power lines, and a plurality of pixel circuits provided corresponding to intersections of the plurality of data lines and the plurality of scanning lines, each of the plurality of pixel circuits includes an electro-optical element, a driving transistor having a first terminal, a second terminal and a channel region arranged between the first terminal and the second terminal, and a first switching transistor arranged between the first terminal and a gate of the driving transistor to control the electrical coupling between the first terminal and the gate, wherein a conduction state of the driving transistor is set according to a data signal which is supplied via one data line of the plurality of data lines, a driving voltage or a driving current according to the conduction state of the driving transistor is supplied to the electro-optical element, wherein during at least a part of a period in which the first terminal and the gate of the driving transistor are electrically coupled to each other via the first switching transistor, the voltage level of the first terminal and/or the second terminal is set such that the first terminal functions as a drain, and wherein during at least a part of a period in which the driving voltage or the driving current is supplied to the electro-optical element, the voltage level of the first terminal and/or the second terminal is set such that the second terminal functions as the drain.

In the above-mentioned electro-optical device, each of the plurality of pixel circuits may further include a first capacitor having a first electrode and a second electrode with a capacitance formed therebetween; and a second switching transistor that controls the electrical coupling between the one data line and the second electrode, in which the gate of the driving transistor may be coupled to the first electrode, during at least a part of the period in which the first terminal functions as the drain of the driving transistor, an initializing current may flow between the first terminal and the second terminal, and the gate of the driving transistor may be set to an offset level according to the threshold value of the driving transistor, and then by a capacitive coupling via the first capacitor when the data signal is supplied via the second switching transistor, the gate voltage of the driving transistor may be set to a voltage level according to the data signal and the offset level.

In the above-mentioned electro-optical device, each of the plurality of pixel circuits may include a second capacitor having a third electrode and a fourth electrode with a capacitance formed therebetween, in which the third electrode may be coupled to the gate of the driving transistor, and the fourth electrode may be coupled to the first terminal. Thus, it is possible to automatically adjust the voltage level of the gate of the driving transistor with respect to change in voltage level of the first terminal by a capacitive coupling via the second capacitor.

In the above-mentioned electro-optical device, preferably, the second terminal is coupled to one power line of the plurality of power lines, and the one power line is settable to a plurality of voltage levels.

An electro-optical device according to another aspect of the present invention includes a plurality of data lines, a plurality of scanning lines, a plurality of power lines, and a plurality of pixel circuits provided corresponding to intersections of the plurality of data lines and the plurality of scanning lines, each of the plurality of pixel circuits includes an electro-optical element, a driving transistor having a first terminal, a second terminal and a channel region arranged between the first terminal and the second terminal, and a compensating transistor having a third terminal, a fourth terminal and a channel region arranged between the third terminal and the fourth terminal, in which the third terminal and its gate are coupled to each other, wherein a conduction state of the driving transistor is set according to a data signal supplied via one data line of the plurality of data lines, the third terminal or the fourth terminal is coupled to one power line of the plurality of power lines, a driving voltage or a driving current according to the conduction state of the driving transistor is supplied to the electro-optical element, and the one power line is settable to a plurality of voltage levels.

In the above-mentioned electro-optical device, during at least a part of a period in which the third terminal functions as a drain of the compensating transistor, the voltage level of the one power line may be set to a first voltage level, and during at least a part of a period in which the driving voltage or the driving current is supplied to the electro-optical element, the voltage of the one power line may be set to a second voltage level, and the first voltage level is different from the second voltage level.

In the above-mentioned electro-optical device, during at least a part of the period in which the third terminal functions as a drain of the compensating transistor, the voltage level of the gate of the driving transistor may be set to an offset level according to the threshold voltage of the compensating transistor.

In the above-mentioned electro-optical device, the fourth terminal may be coupled to the one data line, and the first voltage level may be set to be lower than the second voltage level.

In the above-mentioned electro-optical device, the first terminal or the second terminal may be coupled to the one power line.

Thus, it is possible to reduce the number of wiring lines per one pixel circuit.

In the above-mentioned electro-optical device, the first terminal or the second terminal may be coupled to a power line of the plurality of power lines other than the single power line.

In the above-mentioned electro-optical device, the plurality of power lines preferably extends in a direction intersecting the plurality of data lines.

In the above-mentioned electro-optical device, transistors included in each of the plurality of pixel circuits preferably include only three transistors.

Thus, it is possible to enhance the aperture ratio.

An electronic apparatus may include an electro-optical device described above.

A method of driving an electronic device according to another aspect of the present invention include setting the voltage of a node coupled to a gate of a driving transistor to an offset level according to the threshold value of the driving transistor by connecting electrically the gate and one of a source and a drain of the driving transistor to each other and applying a non-forward bias between the source and the drain of the driving transistor, writing data on the basis of the offset level in a capacitor coupled to the node by supplying a data line capacitively coupled to the node with a voltage from with a variable voltage source, and generating a current according to the data stored in the capacitor by applying a forward bias between the source and the drain of the driving transistor, and supplying a current detection circuit with the current.

There is provided a method of driving an electronic device according to another aspect of the present invention having a driving transistor that has a first terminal, a second terminal and a channel region arranged between the first terminal and the second terminal.

The method include setting a voltage level of the first terminal to be higher than a voltage level of the second terminal during at least a part of a period in which compensation of characteristics of the driving transistor is performed, and setting a voltage level of the first terminal to be lower than a voltage level of the second terminal during at least a part of a period in which at least one of a driving voltage and a driving current according to a conduction state of the driving transistor is supplied to driven element.

In the above-mentioned method of driving an electronic device, in a state in which the first terminal and the gate of the driving transistor are coupled to each other, the compensation step is preferably performed.

There is a method of driving a pixel circuit according another aspect of the present invention, the method comprising: setting the voltage of a node coupled to a gate of a driving transistor to an offset level according to the threshold value of the driving transistor by coupling the gate and one terminal of the driving transistor to each other and applying a non-forward bias to the driving transistor; writing data based on the offset level in a capacitor coupled to the node by supplying a data line capacitively coupled to the node with a data voltage defining the grayscale of a pixel; and generating a driving current according to data stored in the capacitor by applying a forward bias to the driving transistor, and supplying an electro-optical element coupled to the driving transistor with the driving current, such that the brightness of the electro-optical element is set.

In the above-mentioned method of driving a pixel circuit, the other terminal of the driving transistor may be coupled to a power line whose voltage of a node is variably set. In this case, preferably, the setting the voltage includes setting the voltage of the power line to a first voltage, and generation of the driving current includes setting the voltage of the power line to a second voltage higher than the first voltage. Further, writing data preferably includes setting the voltage of the power line to the first voltage.

In the above-mentioned method of driving a pixel circuit, preferably, the first voltage is lower than the voltage of one terminal of the driving transistor when a non-forward bias is applied, and the second voltage is higher than the voltage of one terminal of the driving transistor when a forward bias is applied. Further, preferably, to a counter electrode of the electro-optical element, a predetermined voltage is fixedly applied.

The above-mentioned method of driving a pixel circuit may further comprise applying a non-forward bias to the electro-optical element by setting the voltage of the power line to a third voltage lower than the predetermined voltage. Further, the above-mentioned method of driving a pixel circuit may further comprise applying a non-forward bias to the electro-optical element by applying the third voltage lower than the predetermined voltage to the node that couples the driving transistor and the electro-optical element to each other.

There is provided a method of driving a pixel circuit according to another aspect of the present invention, the method comprising: setting the voltage of a node coupled to a gate of a compensating transistor to an offset level according to the threshold value of the compensating transistor by applying a predetermined bias to the compensating transistor whose gate and one terminal are coupled to each other to form a forward diode-coupling and by applying a non-forward bias to a driving transistor different from the compensating transistor; writing data based on the offset level in a capacitor coupled to the node by applying a reverse bias against the predetermined bias to the compensating transistor and supplying a data line capacitively coupled to the node with a data voltage defining the gray scale of a pixel; and generating a driving current according to data stored in the capacitor by applying a forward bias to the driving transistor and supplying an electro-optical element coupled to one terminal of the driving transistor with the driving current, such that the brightness of the electro-optical element is set.

Here, in the above-mentioned method of driving a pixel circuit, the other terminal of the driving transistor may be coupled to a first power line whose voltage is variably set, and the other terminal of the compensating transistor may be coupled to a second power line whose voltage is variably set. In this case, preferably, setting the voltage of a node includes setting the voltage of the first power line to a first voltage and setting the voltage of the second power line to a second voltage, writing data includes setting the voltage of the second power line to a third voltage higher than the second voltage, and generating a voltage includes setting the voltage of the first power line to a fourth voltage higher than the first voltage. Further, preferably, writing data includes setting the voltage of the first power line to the first voltage, and generating voltage includes setting the voltage of the second power line to the third voltage.

In the above-mentioned method of driving a pixel circuit, preferably, the first voltage is lower than the voltage of one terminal of the driving transistor when a non-forward bias is applied, the second voltage is lower than the voltage of one terminal of the compensating transistor when a non-forward bias is applied, the third voltage is higher than the voltage of one terminal of the compensating transistor when a forward bias is applied, and the fourth voltage is higher than the voltage of one terminal of the driving transistor when a forward bias is applied. Further, to a counter electrode of the electro-optical element, preferably, a predetermined voltage is fixedly applied.

The above-mentioned method of driving a pixel circuit may further comprise applying a non-forward bias to the electro-optical element by setting the voltage of the power line to a fifth voltage lower than the predetermined voltage.

There is a pixel circuit according to another aspect of the present invention, the pixel circuit comprising: an electro-optical element whose brightness is set by a driving current flowing therethrough; a driving transistor that generates the driving current according to a gate voltage, one terminal of which is coupled to a power line whose voltage is variably set and the other terminal of which is coupled to the electro-optical element; a first capacitor whose one electrode is coupled to a gate of the driving transistor; a second capacitor one electrode of which is coupled to the gate of the driving transistor and the other electrode of which is coupled to the other terminal of the driving transistor; a first switching transistor one terminal of which is coupled to the other electrode of the first capacitor and the other terminal of which is coupled to a data line; and a second switching transistor one terminal of which is coupled to the gate of the driving transistor and the other terminal of which is coupled to the other terminal of the driving transistor.

Here, in the above-mentioned pixel circuit, in an initializing period in which the first switching transistor is turned off and the second switching transistor is turned on, the voltage of the power line may be set to a first voltage to allow a non-forward bias to be applied to the driving transistor, and the gate voltage of the driving transistor may be set to an offset level according to the threshold value of the driving transistor. Further, in a data writing period after the initializing period, in which the first switching transistor is turned on and the second switching transistor is turned off, a data voltage defining the grayscale of a pixel may be supplied to the data line, and data based on the offset level may be written in the first capacitor and the second capacitor. In addition, in a driving period after the data writing, in which the first switching transistor and the second switching transistor are turned off, the voltage of the power line is set to a second voltage higher than the first voltage to allow a forward bias to be applied to the driving transistor, and the driving current according to data stored in the first capacitor and the second capacitor may be supplied to the electro-optical element, such that the brightness of the electro-optical element may be set.

There is provided a pixel circuit according to a aspect of the present invention, the pixel circuit comprising: an electro-optical element whose brightness is set by a driving current flowing therethrough; a driving transistor for generating the driving current according to a gate voltage, whose one terminal is coupled to a first power line whose voltage is variably set and the other terminal thereof is coupled to the electro-optical element; a first capacitor whose one electrode is coupled to a gate of the driving transistor; a second capacitor whose one electrode is coupled to the gate of the driving transistor and the other terminal thereof is coupled to the other terminal of the driving transistor; a switching transistor one terminal of which is coupled to the other electrode of the first capacitor and the other terminal of which is coupled to a data line; and a compensating transistor a gate and one terminal of which are coupled to the gate of the driving transistor and the other terminal of which is coupled to a second power line whose voltage is variably controlled.

Here, in the above-mentioned pixel circuit, in an initialing period in which the switching transistor is turned off, the voltage of the first power line may be set a first voltage to allow a non-forward bias to be applied to the driving transistor and the voltage of the second power line may be set to a second voltage to allow a forward diode-coupling to be formed in the compensating transistor, such that the gate voltage of the driving transistor may be set to an offset voltage according to the threshold value of the compensating transistor. Further, in a data writing period after the initializing period, in which the switching transistor is turned on, the voltage of the second power line may be set to a third voltage higher than the second voltage to allow a reverse bias against that during the initializing period to be applied to the compensating transistor, and a data voltage defining the gray scale of a pixel may be supplied to the data line, such that data based on the offset may be written in the first capacitor and the second capacitor. In addition, in a driving period after the data writing period, in which the switching transistor is turned off, the voltage of the first power line may be set to a fourth voltage higher than the first voltage to allow a forward bias to be applied to the driving transistor, and the driving current according to data stored in the first capacitor and the second capacitor may be supplied to the electro-optical element, such that the brightness of the electro-optical element may be set.

There is provided a pixel circuit according to another aspect of the present invention, the pixel circuit comprising: an electro-optical element whose brightness is set by a driving current flowing therethrough; a driving transistor for generating the driving current according to a gate voltage, whose one terminal is coupled to a first power line whose voltage is variably set; a first capacitor whose one electrode is coupled to a gate of the driving transistor; a second capacitor one electrode of which is coupled to the gate of the driving transistor and the other electrode of which is coupled to the other terminal of the driving transistor; a first switching transistor one terminal of which is coupled to the other electrode of the first capacitor and the other terminal of which is coupled to a data line; a second switching transistor one terminal of which is coupled to the gate of the driving transistor and the other terminal of which is coupled to the other terminal of the driving transistor; a third switching transistor whose one terminal is coupled to the other terminal of the driving transistor and the other terminal thereof is coupled to a second power line whose voltage is variably set; and a fourth switching transistor whose one terminal is coupled to the other terminal of the driving transistor and the other terminal thereof is coupled to the electro-optical element.

Here, in the above-mentioned pixel circuit, in an initializing period in which the first switching transistor is turned off, the second switching transistor is turned on, the third switching transistor is turned on for a part of the period and the fourth switching transistor is turned off, the voltage of the first power line is set to a first voltage and the voltage of the second power line is set to a second voltage, such that a non-forward bias may be applied to the driving transistor and the gate voltage of the driving transistor may be set to an offset voltage according to the threshold value of the driving transistor. Further, in a data writing period after the initializing period, in which the first switching transistor is turned on, the second switching transistor is turned off, the third switching transistor is turned off and the fourth switching transistor is turned off, a data voltage defining the gray scale of a pixel may be supplied to the data line, such that data based on the offset voltage may be written in the first capacitor and the second capacitor. In addition, in a driving period after the data writing period, in which the first switching transistor is turned off, the second switching transistor is turned off, the third switching transistor is turned off and the fourth switching transistor is turned on, the voltage of the first power line may be set to a third voltage higher than the first voltage to allow a forward bias to be applied to the driving transistor, and the driving current according to data stored in the first capacitor and the second capacitor may be supplied to the electro-optical element, such that the brightness of the electro-optical element may be set. Then, in a reverse bias period after the driving period, in which the first switching transistor is turned off, the second switching transistor is turned off, the third switching transistor is turned on and the fourth switching transistor is turned on, the voltage of the second power line may be set to a fourth voltage higher than the second voltage to allow a non-forward bias to be applied to the electro-optical element.

There is provided a pixel circuit according to another aspect of the present invention, the pixel circuit comprising: an electro-optical element whose brightness is set by a driving current flowing therethrough; a driving transistor for generating the driving current according to a gate voltage, one terminal of which is coupled to a power line whose voltage is variably set and the other terminal of which is coupled to the electro-optical element; a capacitor whose one electrode is coupled to a gate of the driving transistor; a first switching transistor whose one terminal is coupled to the other electrode of the capacitor and the other terminal thereof is coupled to a data line; and a second switching transistor one terminal of which is coupled to the gate of the driving transistor and the other terminal of which is coupled to the other terminal of the driving transistor.

Here, in the above-mentioned pixel circuit, in an initializing period in which the first switching transistor is turned off and the second switching transistor is turned on, the voltage of the power line may be set to a first voltage to allow a non-forward bias to be applied to the driving transistor, and the gate voltage of the driving transistor may be set to an offset voltage according to the threshold value of the driving transistor.

Further, in a data writing period after the initializing period, in which the first switching transistor is turned on and the second switching transistor is turned off, a data voltage defining the gray scale of a pixel may be supplied to a data line, and data based on the offset voltage may be written in the capacitor. In addition, in a driving period after the data writing period, in which the first switching transistor and the second switching transistor are turned off, the voltage of the power line may be set to a second voltage higher than the first voltage to allow a forward bias to be applied to the driving transistor, and the driving current according to data stored in the capacitor may be supplied to the electro-optical element, such that the brightness of the electro-optical element may be set.

An electro-optical device comprised of the above-mentioned pixel circuit may be used for an electronic apparatus.

DETAILED DESCRIPTION OF PREFERRED EMBODIMENTS

1. First Exemplified Embodiment

Figure 1:
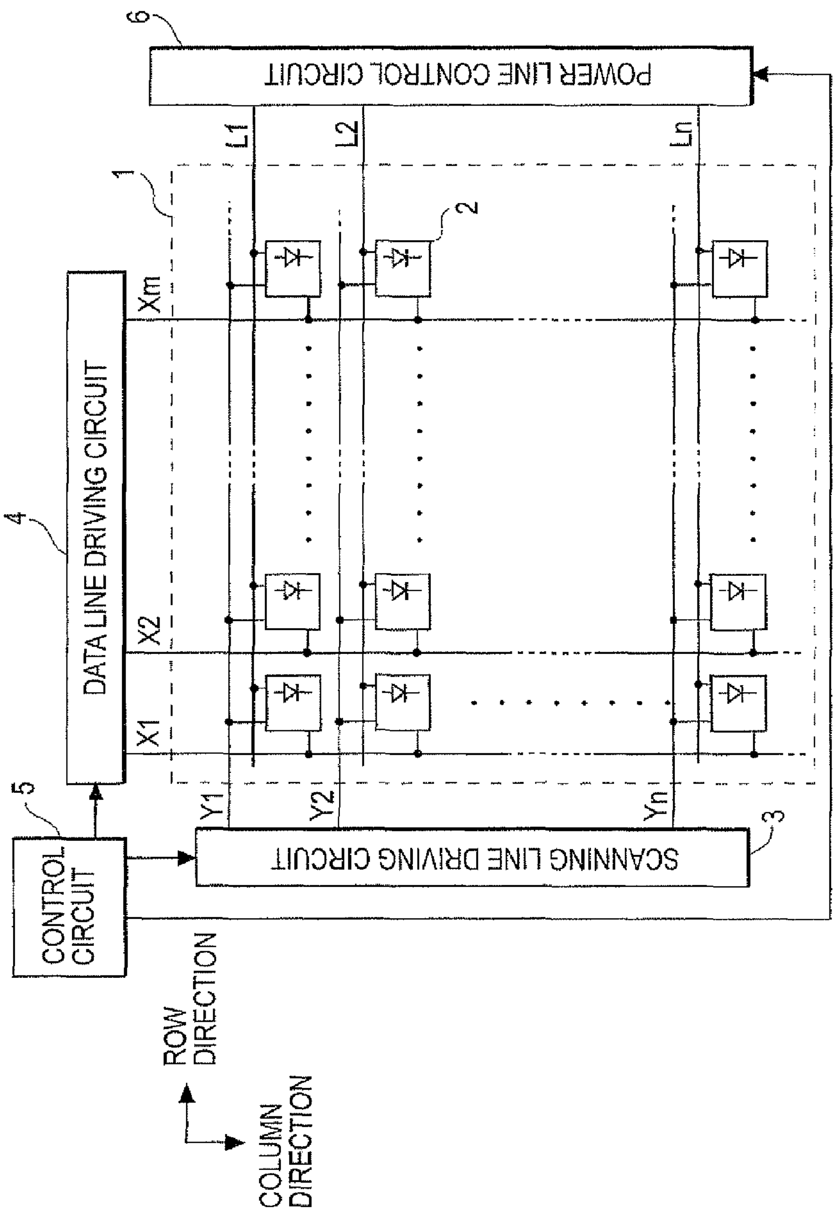
FIG. 1 is a block diagram showing the configuration of an electro-optical device.

FIG. 1 is a block diagram showing the configuration of an electro-optical device according to the present embodiment. A display unit 1 is, for example, an active matrix type display panel in which the electro-optical elements are driven by thin film transistors (TFTs). In the display unit 1, m dots by n lines of a group of pixels are arranged in a matrix (in a two-dimensional plan view). In the display unit 1, a group of scanning lines Y1 to Yn each extending in a horizontal direction and a group of data lines X1 to Xm each extending in a vertical direction are provided, and pixels 2 (pixel circuits) are arranged corresponding to intersections of the scanning lines and the data lines. Power lines L1 to Ln are provided in correspondence with the scanning lines Y1 to Yn, and extend in a direction intersecting the data lines X1 to Xm, in other words, a direction in which the scanning lines Y1 to Yn extend. To the respective power lines L1 to Ln, a row of pixels (m dots) along a direction in which one scanning line Y extend are commonly coupled. Moreover, in the present embodiment, one pixel 2 is a minimum unit for image display, but in the case of color panel, one pixel 2 may comprise three sub-pixels of R, G and B.

Figure 2:
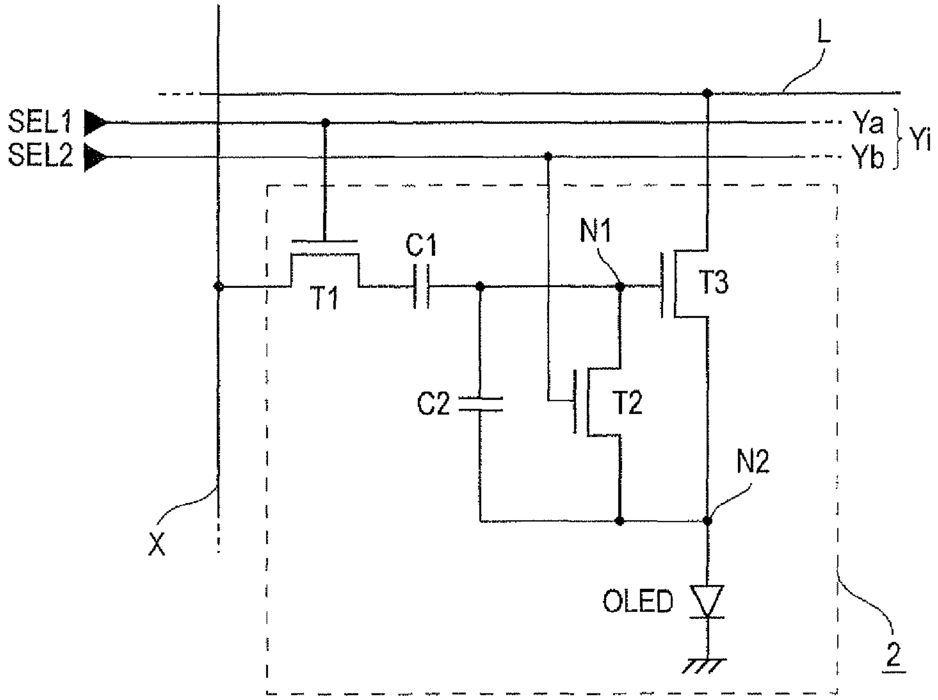
FIG. 2 is a diagram of a pixel circuit according to a first exemplified embodiment.
Figure 6:
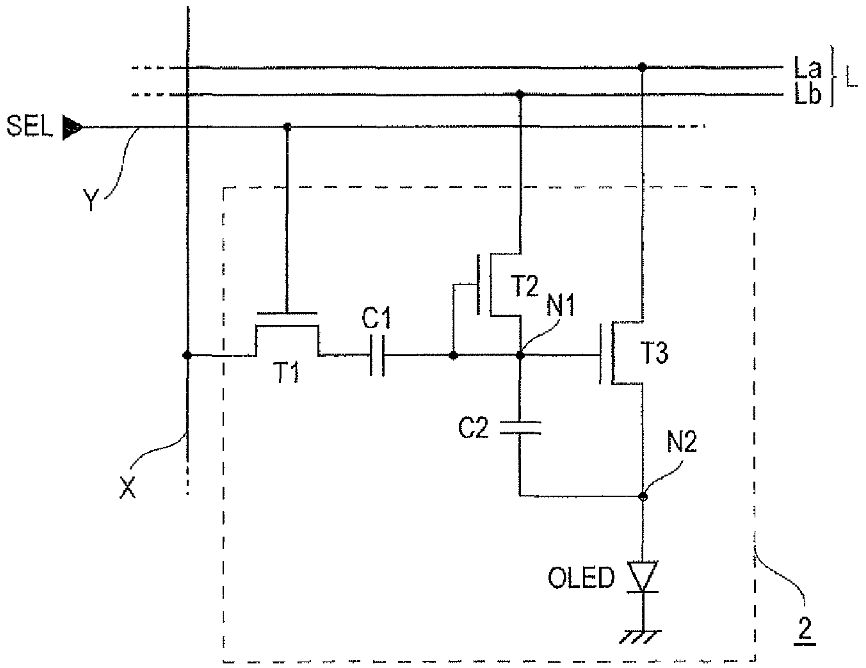
FIG. 6 is a diagram of a pixel circuit according to a third exemplified embodiment.
Figure 9:
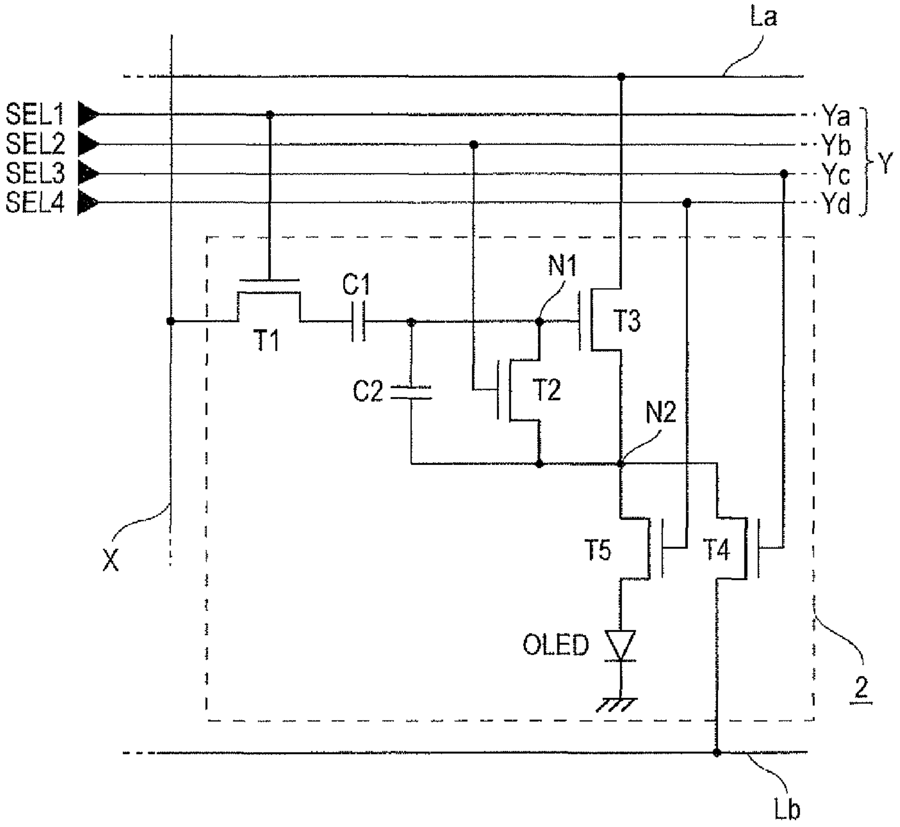
FIG. 9 is a diagram of a pixel circuit according to a fourth exemplified embodiment.
Figure 11:
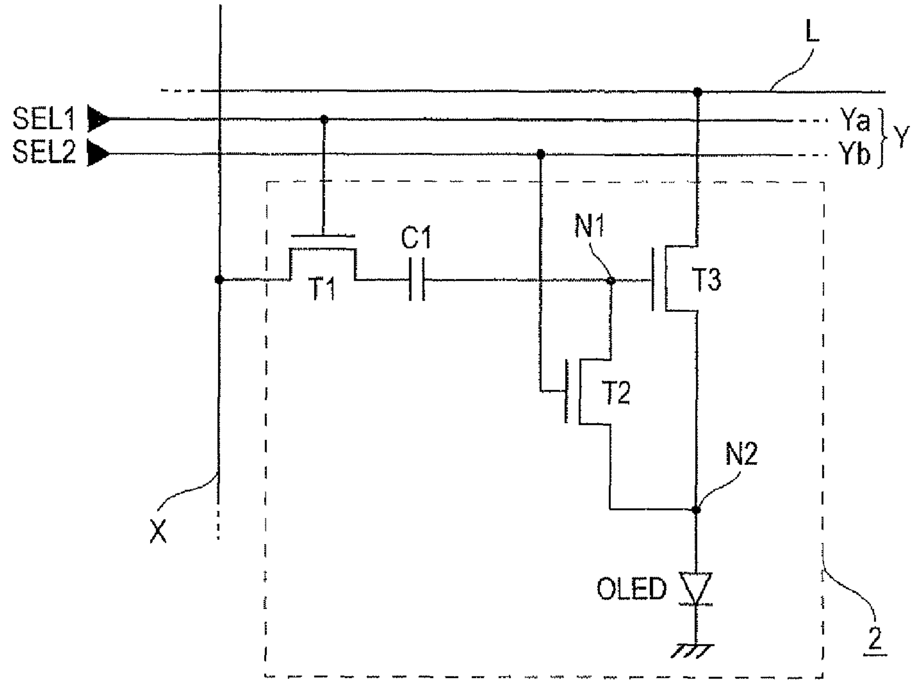
FIG. 11 is a diagram of a pixel circuit according to a fifth exemplified embodiment.

Moreover, as regards the configuration of pixel circuits according to the respective embodiments described below, a scanning line Y shown in FIG. 1 may represent a respective one of scanning lines (FIG. 6) or may represent a set of plural scanning lines (FIGS. 2, 9 and 11). Similarly, a power line L shown in FIG. 1 may represent a respective one of power lines (FIGS. 2 and 11) or may represent a set of plural power lines (FIGS. 6 and 9).

A control circuit 5 synchronously controls a scanning line driving circuit 3, a data line driving circuit 4 and a power line control circuit 6 based on a vertical synchronizing signal Vs, a horizontal synchronizing signal Hs, a dot clock signal DCLK, grayscale data D, and so on, which are inputted from preceding devices (not shown). Under the synchronous control, the scanning line driving circuit 3, the data line driving circuit 4 and the power line control circuit 6 cooperates with each other to control display on the display unit 1.

The scanning line driving circuit 3 mainly includes shift registers, output circuits, and so on, and outputs a scanning signal SEL to the scanning lines Y1 to Yn to perform line sequential scanning. The scanning signal SEL is a two-level signal of a high potential level (hereinafter, referred to as 'H level') and a low potential level (hereinafter, referred to as 'L level'). A scanning line corresponding to a row of pixels to which data is written is set to H level and other scanning lines are set to L level. The scanning line driving circuit 3 performs sequential scanning for selecting each scanning line Y in a predetermined order (in general, from top to bottom) for every period (1F) in which images of one frame are displayed. Further, the data line driving circuit 4 mainly includes shift registers, line latch circuits, output circuits, and so on.

In one horizontal scanning period (1H) corresponding to the period in which one scanning line is selected, the data line driving circuit 4 simultaneously outputs a data voltage Vdata to a row of pixels to which current data is written, and at the same time, latches in a point sequential manner data relevant to a row of pixels to be written in next one horizontal scanning period (1H). In any horizontal scanning period (1H), m data items corresponding to the number of data lines X are sequentially latched. Then, in next one horizontal scanning period (1H), the latched m data voltages Vdata are simultaneously outputted to the corresponding data lines X1 to Xm.

Meanwhile, the power line control circuit 6 mainly includes shift registers, output circuits and so on, and variably set voltages of the power lines L1 to Ln in units of rows of pixels in synchronization with the line sequential scanning by means of the scanning line driving circuit 3.

FIG. 2 is a diagram of a voltage follower type voltage-programmed mode pixel circuit according to the present embodiment. As regards the pixel circuit, one scanning line Y shown in FIG. 1 includes a first scanning line Ya to which a first scanning signal SEL1 is supplied and a second scanning line Yb to which a second scanning signal SEL2 is supplied. One pixel circuit is comprised of an organic EL element OLED which is an aspect of a driven element, three transistors T1 to T3 and two capacitors C1 and C2 storing data. Moreover, in the present embodiment, since the TFT is made of amorphous silicon, the respective transistors are an n-channel type, but the transistors are not limited to the n-channel type and transistor made of amorphous silicon. This is true of respective embodiments described below. Further, in the present specification, as regards a three-terminal type transistor having a source, a drain and a gate, one of the source and drain is referred to as ‘one terminal’ and the other is referred as ‘the other terminal’.

A gate of a first switching transistor T1 is coupled to the first scanning line Ya to which the first scanning signal SEL1 is supplied, and the conduction of the first switching transistor is controlled by the scanning signal SEL1. One terminal of the first switching transistor T1 is coupled to the data line X, and the other terminal of the first switching transistor T1 is coupled to one electrode of a first capacitor C1. The other electrode of the capacitor C1 is coupled to a node N1. To the node N1, other than the first capacitor C1, a gate of a driving transistor T3, one terminal of a second switching transistor T2 and one electrode of a second capacitor C2 are commonly coupled. One terminal of the driving transistor T3 is coupled to a power line L, and the other terminal of the driving transistor T3 is coupled to a node N2. To the node N2, other than the driving transistor T3, an anode of the organic EL element OLED, the other terminal of the second switching transistor T2 and the other electrode of the second capacitor C2 are commonly coupled. To a cathode of the organic EL element OLED, that is, a counter electrode, a reference voltage Vss (for example, 0 V) lower than a power voltage Vdd is fixedly applied. The second capacitor C2 is provided between the gate of the driving transistor T3 and the node N2, such that a voltage follower type circuit is constructed. The second switching transistor T2 is provided in parallel to the second capacitor C2. A gate of the switching transistor T2 is coupled to the second scanning line Yb to which the second scanning signal SEL2 is supplied, and is controlled by the scanning signal SEL2.

Figure 3:
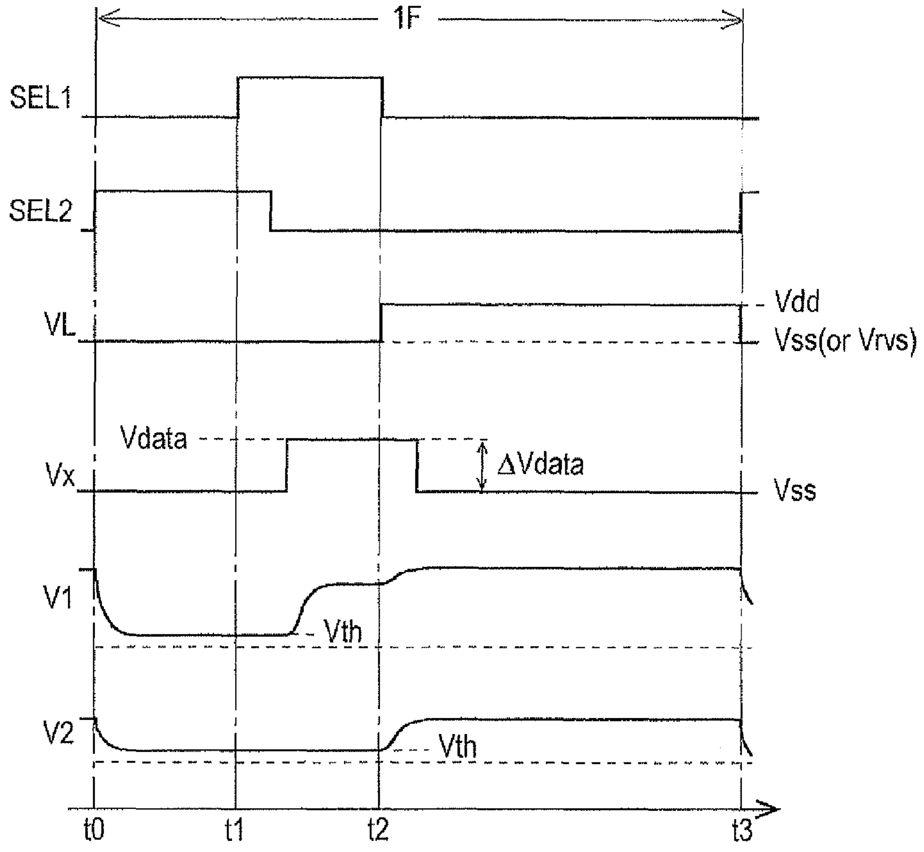
FIG. 3 is a timing chart of operation according to the first exemplified embodiment.

FIG. 3 is a timing chart of operation of the pixel circuit shown in FIG. 2. During a period t0 to t3 corresponding to one frame period 1F described above, a consecutive process is generally divided into an initializing process during an initial period t0 to t1, a data writing process during a subsequent period t1 to t2, and a driving process during a last period t2 to t3.

Figure 4A:
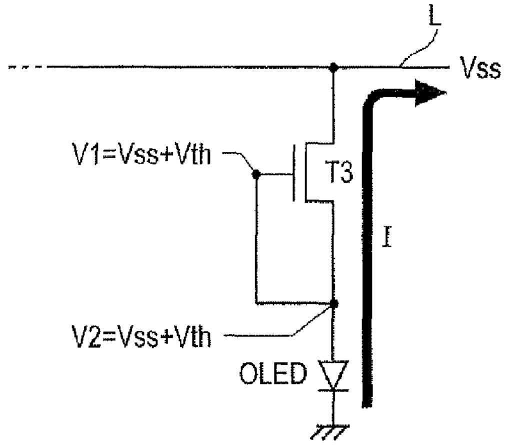
FIG. 4 is an explanatory view of the operation according to the first exemplified embodiment.
Figure 4B:
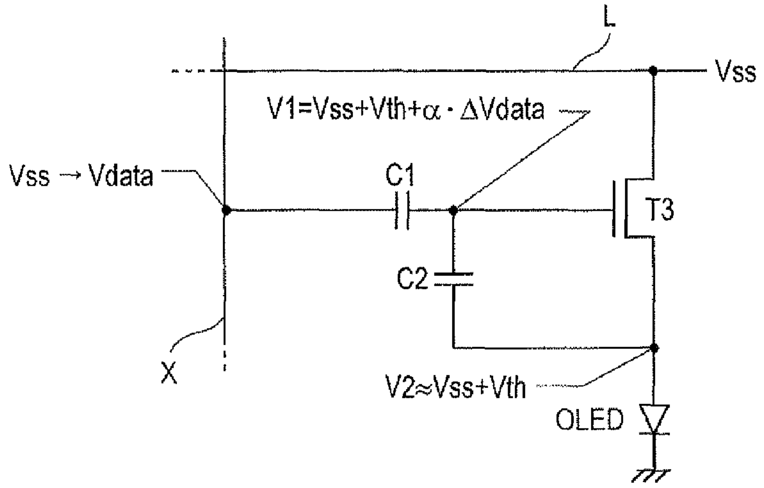
Figure 4C:
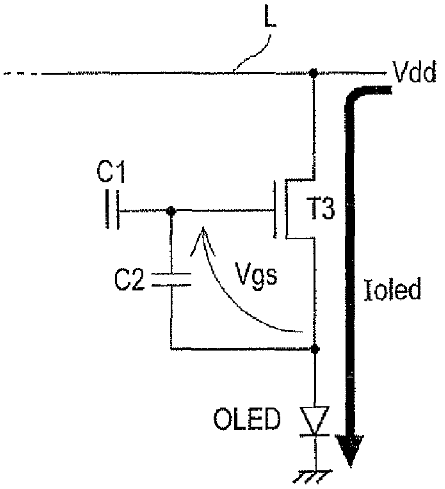

First, during the initializing period t0 to t1 Vth compensation of the driving transistor T3 is performed in conjunction with application of a reverse bias. More specifically, the first scanning signal SEL1 becomes L level, and the first switching transistor T1 is turned off, such that the first capacitor C1 and the data line X are electrically isolated from each other. In response to this, the second scanning signal SEL2 becomes H level, and the second switching transistor T2 is turned on. Here, a voltage VL of the power line L is set to the reference voltage Vss, and a voltage V2 of the node N2 is set to a voltage level higher than at least Vss+Vth, through the driving process of a previous one frame period 1F (a specified value of the voltage V2 depends on data or characteristics of the driving transistor, the organic EL element, and so on during the previous one frame period 1F). From such a voltage relation, a reverse bias against a driving current Ioled described below is applied to the driving transistor T3, such that the driving transistor is diode-connected in which the gate and the drain (a terminal of the node N2 side) of the driving transistor are forwardly coupled to each other. Thus, as shown in FIG. 4(*a*), until the voltage V2 of the node N2 (and the voltage V1 of the node N1 directly coupled to the node N2) reaches an offset level (Vss+Vth) according to Vth of the driving transistor T3, a reverse current I against the driving current Ioled which flows during the driving period t2 to t3 flows from the node N2 to the power line L. The capacitors C1 and C2 coupled to the node N1 are set to such a charge state that the voltage V1 of the node N1 becomes the offset level (Vss+Vth), prior to data writing. Thus, prior to the data writing, the voltage of the node N1 is offset to the offset level (Vss+Vth), such that it is possible to compensate the threshold value Vth of the driving transistor T3.

Next, during the data writing period t1 to t2, based on the offset level (Vss+Vth) set during the initializing period t0 to t1, the data writing to the capacitors C1 and C2 is performed. More specifically, if the second scanning signal SEL2 falls to L level, the second switching transistor T2 is turned off, and a diode coupling of the driving transistor T3 is released. In ‘synchronization’ with the falling of the scanning signal SEL2, the first scanning signal SEL1 rises to H level, and the first switching transistor T1 is turned on. Thus, the data line X and the first capacitor C1 are electrically connected to each other. In the present specification, the term ‘synchronization’ is used to represent a tolerable time offset to a margin for design as described above as well as the same timing. Then, at a point of time after predetermined time from the timing t1 has lapsed, a voltage Vx of the data line X rises to the data voltage Vdata (data of a voltage level defining a display grayscale of the pixel 2) from the reference Vss. As shown in FIG. 4(*b*), the data line X and the node N1 are capacitively coupled each other via the first capacitor C1. For this reason, the voltage V1 of the node N1 rises by $\alpha\cdot\Delta$Vdata based on the offset voltage (Vss+Vth) according to the amount of change of the voltage of the data line X $\Delta$Vdata (=Vdata−Vss), as shown in the following equation 1. Moreover, in Equation 1, a coefficient $\alpha$ is a coefficient specified by a capacitance ratio of a capacitance Ca of the first capacitor C1 and a capacitance Cb of the second capacitor C2 ($\alpha$=Ca/(Ca+Cb)).

$$V1 = Vss + Vth + \alpha \cdot \Delta Vdata = Vss + Vth + \alpha(Vdata - Vss) \quad \text{(Equation 1)}$$

In the capacitors C1 and C2, charges corresponding to the voltage V1 calculated by means of Equation 1 are written as data. The nodes N1 and N2 are capacitively coupled each other via the second capacitor C2, but if the capacitance of the capacitor C2 is set to be sufficiently lower than the capacitance of the organic EL element OLED, during the period t1 to t2, the voltage V2 of the node N2 is hardly influenced by change of the voltage of the node N1, and is almost maintained at Vss+Vth. Moreover, during the period t1 to t2, if the voltage VL of the power line is set to Vss, the driving current Ioled does not flow, it is possible to restrict the emitting of the organic EL element OLED.

Subsequently, during the driving period t2 to t3, a driving current Ioled corresponding to a channel current of the driving transistor T3 is supplied to the organic EL element, such that the organic EL element emits. More specifically, the first scanning signal SEL1 becomes L level again, and the first switching transistor is turned off. Thus, the data line X to which the data voltage Vdata is supplied and the first capacitor C1 are electrically isolated from each other. However, even after the electrical isolation, to the gate N1 of the driving transistor T3, a voltage according to data stored in the capacitors C1 and C2 is continuously applied. Further, in synchronization with the falling of the first scanning signal SEL1, the voltage VL of the power line L becomes Vdd. As a result, as shown in FIG. 4(*c*), a path of the driving current Ioled from the power line L toward the cathode of the organic EL element OLED is formed. At this time, an opposing terminal with the node N2 and a channel region of the driving transistor T3 interposed therebetween functions as a drain of the driving transistor T3. On the assumption that the driving transistor T3 operates in a saturation region, the driving current Ioled flowing through the organic EL element OLED (a channel current Ids of the driving transistor T3) is calculated based on the following equation 2. In Equation 2, Vgs is a voltage difference between the gate and the source of the driving transistor T3. Further, a gain coefficient β is specified by a mobility)μ of carrier, a gate capacitance A, a channel width W and a channel length L of the driving transistor T3 (β=μAW/L).

$$Ioled = Ids = \beta/2(Vgs - Vth)^2 \quad \text{(Equation 2)}$$

Here, if V1 calculated by means of Equation 1 is substituted for the gate voltage Vgs of the driving transistor T3, Equation 2 is transformed into the following equation 3.

$$\begin{aligned} Ioled &= \beta/2(Vg - Vs - Vth)^2 \quad \text{(Equation 3)} \\ &= \beta/2\{(Vss + Vth + \alpha \cdot \Delta Vdata) - Vs - Vth\}^2 \\ &= \beta/2(Vss + \alpha \cdot \Delta Vdata - Vs)^2 \end{aligned}$$

In Equation 3, it is important that the driving current Ioled generated by the driving transistor T3 is not dependent on the threshold value Vth of the driving transistor T3 due to the offset of the Vths. Therefore, if the data writing to the capacitor C1 and C2 is performed based on the Vth, it is possible to generate the driving current Ioled without being influenced even when unevenness in Vth is caused by manufacturing unevenness or change with lapse of time.

The emitting brightness of the organic EL element OLED is determined by the driving current Ioled according to the data voltage Vdata (the amount of change of the voltage ΔVdata, and thus the grayscale of the pixel 2 is set. Moreover, if the driving current Ioled flows through the path shown in FIG. 4(*c*), a source voltage V2 of the driving transistor T3 rises more than an initial Vss+Vth due to the self-resistance of the organic EL element OLED. However, since the gate N1 of the driving transistor T3 and the node N2 are capacitively coupled each other via the second capacitor C2, and the gate voltage V1 also increases as the source voltage V2 increases, it is possible to reduce, to a certain degree, influence of change of the source voltage V2 on the gate-to-source voltage Vgs.

In such a manner, in the present embodiment, the voltage V1 of the power line L is variably set to Vss during the initializing period t0 to t1 and to Vdd higher than Vss during the driving period t2 to t3. During the initializing period t0 to t1, the set voltage Vss is needed to be lower than the voltage V2 of the node N2 coupling the driving transistor T3 and the organic EL element OLED to each other such that a reverse bias is applied to the driving transistor T3. Further, during the driving period t2 to t3, the set voltage Vdd is needed to be higher than the voltage V2 of the node N2 such that a forward bias is applied to the driving transistor T3 to allow the path of the driving current baled to be formed. During the initializing period t0 to t1, if VL becomes Vss, a reverse bias is applied to the driving transistor T3, and thereunder Vth compensation is performed. By performing the Vth compensation, it is possible to reduce influence of unevenness in Vth on the driving current Ioled. Further, by applying the reverse bias, it is possible to effectively suppress shift of Vth in the driving transistor T3, that is, a change of Vth with lapse of time. Then, by performing the Vth compensation and the application of the reverse bias in the same operation process, it is possible to enhance the flexibility of operational design. Moreover, in the present embodiment, during the initializing period t0 to t1, by falling the voltage VL of the power line L to the reference voltage Vss, the reverse bias is applied to the driving transistor T3. However, during the period t0 to t1, the voltage VL may be set to Vrvs lower than Vss. In this case, since the voltage Vrvs of the power line L is lower than the voltage Vss of the counter electrode of the organic EL element OLED, a reverse bias can be applied to the organic EL element OLED as well as the driving transistor T3. As a result, it is possible to lengthen the life span of the organic EL element OLED. Further, if a concept of the present embodiment is more widely applied, by performing the Vth compensation in a state in which a forward bias is not applied to the driving transistor T3, that is, a non-forward bias is applied to the driving transistor T3, it is also possible to obtain the above-mentioned advantages. Therefore, although a reverse bias which is an example of the non-forward bias is a preferred embodiment, the present invention is not limited to this embodiment. Moreover, this is true of the respective embodiments described below.

It is preferred that a period in which the second switching transistor T2 is in the on-state partially overlaps with a part of a period in which the first switching transistor T1 is in the on-state and voltage Vx of the data line X is set to a predetermined level (for example, Vss) during at least a part of the overlapping period in which both of the first switching transistor T1 and the second switching transistor T2 are in the on-states as shown FIG. 3. Herewith the potential of one electrode of the capacitor C1 that forms capacitance with the other electrode of the capacitor C1 coupled to the Node N1 can be precisely determined when the offset level is stored, and setting of the voltage level of the Node N1 by the capacitive coupling via the capacitor C1 when the data voltage Vdata is supplied can be precisely performed.

2. Second Exemplified Embodiment

The present embodiment relates to a technique that the reverse bias is applied to the driving transistor T3 more actively in the pixel circuit shown in FIG. 2. The configuration of the pixel circuit is the same as described above, and the description will be omitted.

Figure 5:
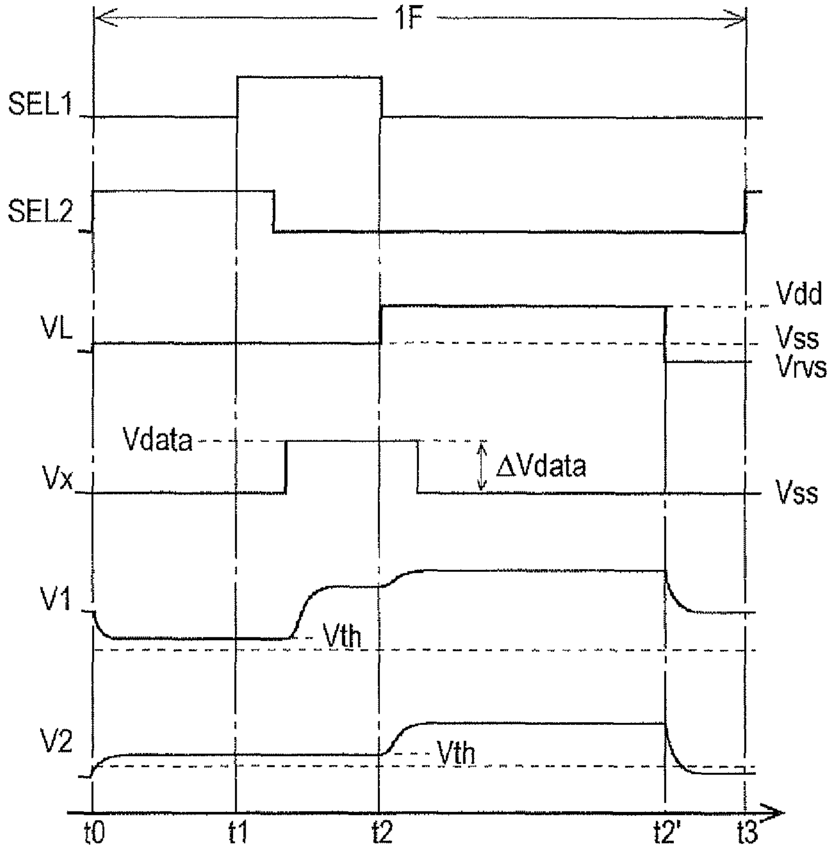
FIG. 5 is a timing chart of operation according to a second exemplified embodiment.

FIG. 5 is a timing chart of operation according to the present embodiment. In the present embodiment, a reverse bias period t2' to t3 is provided during a second half of the driving period t2 to t3, and during the period t2' to t3, the voltage VL of the power line L is set to Vrvs lower than the reference voltage Vss (the voltage of the counter electrode). Thus, the emitting of the organic EL element OLED stops, and the reverse bias is applied to both of the organic EL element OLED and the driving transistor T3.

According to the present embodiment, other than the same advantages as the first embodiment, it is possible to length a life span of the organic EL element OLED since the reverse bias is more effectively applied to the organic EL element OLED during the reverse bias period t2' to t3, too.

3. Third Exemplified Embodiment

FIG. 6 is a diagram of a voltage follower type voltage-programmed mode pixel circuit according to the present embodiment. As regards the pixel circuit, one power line L shown in FIG. 1 includes a first power line La and the second power line Lb. One pixel circuit is comprised of an organic EL element OLED, three n-channel type transistors T1 to T3 and two capacitors C1 and C2 each storing data. Further, a threshold value Vth2 of a compensating transistor T2 is set to be substantially equal to a threshold value Vth1 of the driving transistor T3. As regards the transistors T2 and T3 which are manufactured by the same process and arranged very close to each other on the display unit 1, it is possible to set the electrical characteristics of the transistors T2 and T3 to be almost the same even in the actual product.

A gate of a switching transistor T1 is coupled to the scanning line Y to which a scanning signal SEL is supplied. One terminal of the transistor T1 is coupled to the data line X, and the other terminal of the transistor T1 is coupled to one electrode of a first capacitor C1. The other electrode of the first capacitor C1 is coupled to a node N1. To the node N1, other than the first capacitor C1, a gate of the driving transistor T3, one terminal (and a gate) of the compensating transistor T2 and one electrode of a second capacitor C2 are commonly coupled. One terminal of the driving transistor T3 is coupled to the first power line La, and the other terminal thereof is coupled to a node N2. To the node N2, other than the driving transistor T3, an anode of the organic EL element OLED and the other electrode of the second capacitor C2 are commonly coupled. To a cathode of the organic EL element, the reference voltage Vss is fixedly applied. The second capacitor C2 is provided between the gate of the driving transistor T3 and the node N2, such that a voltage follower type circuit is constructed. The other terminal of the compensating transistor T2 is coupled to the second power line Lb.

Figure 7:
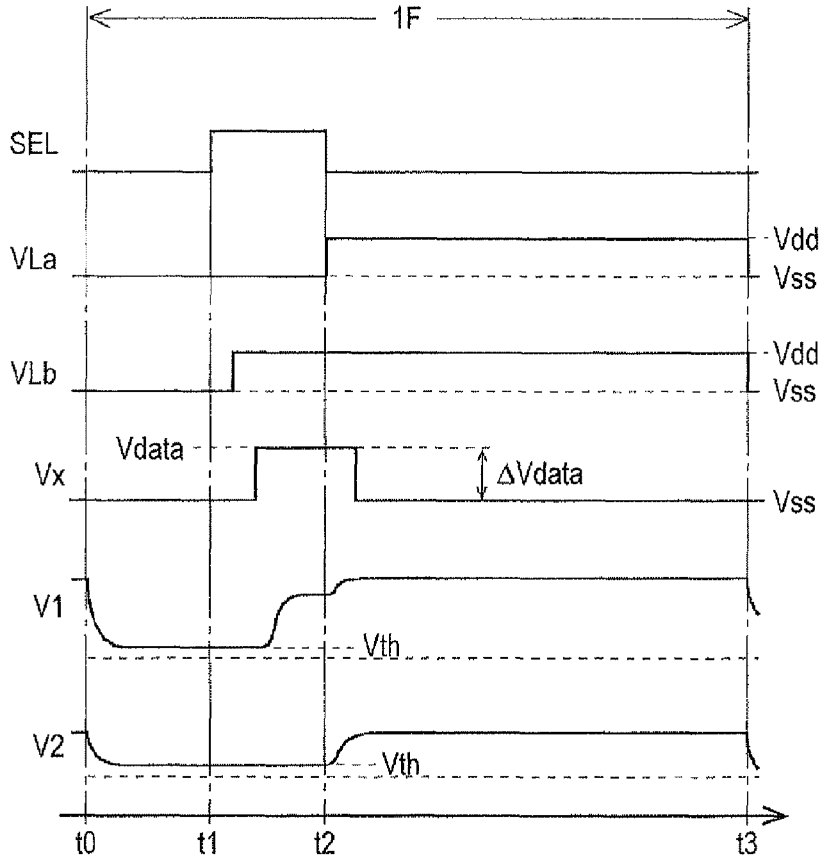
FIG. 7 is a timing chart of operation according to the third exemplified embodiment.

FIG. 7 is a timing chart of operation of the pixel circuit shown in FIG. 6. Similar to the first exemplified embodiment, a period t0 to t3 corresponding to one frame period 1F is generally divided into an initial period t0 to t1, a data writing period t1 to t2, and a driving period t2 to t3.

First, during the initializing period to to t1, application of a reverse bias and Vth compensation to both of the compensating transistor T2 and the driving transistor T3 are simultaneously performed. More specifically, if the scanning signal SEL becomes L level, the switching transistor T1 is turned off, and the first capacitor C1 and the data line X are electrically isolated from each other. Here, a voltage VLb of the second power line Lb is set to Vss and becomes lower than a voltage V1 of the node N1 by means of a driving process during previous one frame period 1F. From such a potential relation, of two terminals with a channel region of the compensating transistor T2 interposed therebetween, a terminal coupled to the gate of the compensating transistor T2 functions as a drain, such that the compensating transistor T2 is forwardly diode-connected (reversely diode-connected if a bias during the driving period t2 to t3 is forward).

Figure 8A:
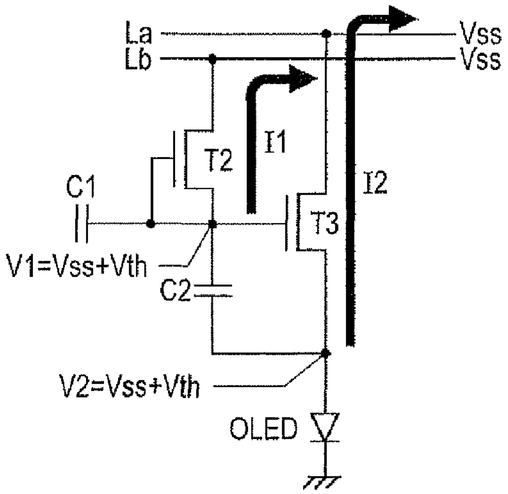
FIG. 8 is an explanatory view of the operation according to the third exemplified embodiment.
Figure 8B:
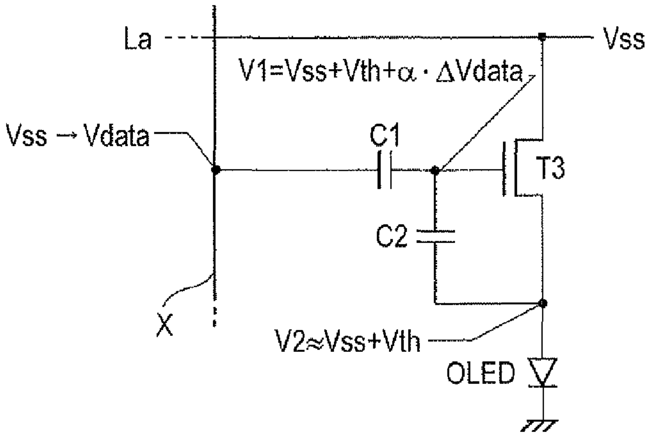

Thus, as shown in FIG. 8(*a*), until the voltage N1 of the node N1 reaches an offset level (Vss+Vth1), an initializing current I1 flows from the node N1 toward the second power line Lb. Prior to the data writing, the capacitors C1 and C2 coupled to the node N1 are set to such a charge state that the voltage V1 of the node N1 becomes the offset level (Vss+Vth).

Further, a voltage VLa of the first power line La is also set to Vss and becomes lower than a voltage V2 of the node N2 by means of the driving process during previous one frame period 1F. For this reason, a reverse bias is also applied to the driving transistor T3, and a current I2 flows from the node N2 toward the first power line La. The current I2 contributes to suppressing change or deterioration of characteristics of the driving transistor T3.

In the data writing t1 to t2, the data writing on the capacitor C1 and C2 is performed based on the offset level (Vss+Vth1) set during the initializing period t0 to t1. More specifically, first, the voltage VLb of the second power line Lb rises from Vss to Vdd, and the voltage VLb becomes higher than the voltage V1 of the node N1. Thus, a reverse bias against a bias during the initializing period t0 to t1 (a forward bias if a bias during the driving period t2 to t3 is forward) is applied to the compensating transistor T2, and the node N1 and the second power line Lb are electrically isolated from each other because the compensating transistor T2 is substantially turned off. In synchronization with the rising of the voltage VLb, the scanning signal SEL rises to H level, and the switching transistor T1 is turned on. Thus, the data line X and the first capacitor C1 are electrically coupled to each other. Then, at a point of time after predetermined time from the timing t1 has lapsed, the voltage Vx of the data line X rises from the reference Vss to the data voltage Vdata. As shown in FIG. 8(*b*), the data line X and the node N1 are capacitively coupled each other via the first capacitor C1. For this reason, the voltage V1 of the node N1 rises by $\alpha \cdot \Delta$Vdata based on the offset level (Vss+Vth1), as shown in the following equation 4. The capacitor C1 and C2 are set to such a charge state that becomes the voltage V1 calculated by means of Equation 4. Moreover, during the period t1 to t2, since the voltage VLa of the first power line La is set to Vss, the driving current Ioled does not flow, such that the organic EL element does not emit.

$$V1 = Vss + Vth1 + \alpha \cdot \Delta Vdata = Vss + Vth1 + \alpha(Vdata - Vss) \quad \text{(Equation 4)}$$

Figure 8C:
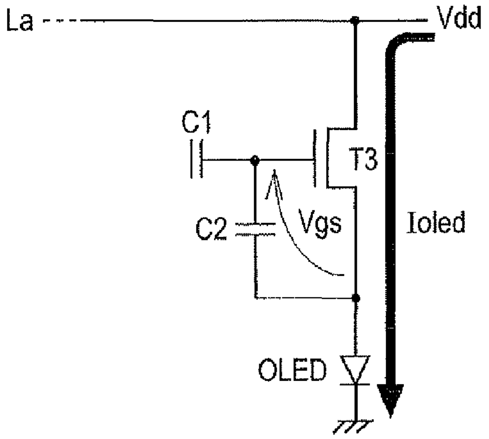

During the driving period t2 to t3, the driving current holed corresponding to a channel current Ids of the driving transistor T3 flows through the organic EL element OLED, and the organic EL element OLED emits. More specifically, the scanning signal SEL becomes L level again, and the switching transistor T1 is turned off. Thus, the data line X to which the data voltage Vdata is supplied and the first capacitor C1 are electrically isolated from each other. However, even in the electrical isolation, to the gate N1 of the driving transistor T3, a gate voltage Vg according to data stored in the capacitors C1 and C2 is continuously applied. Then, in synchronization with the falling of the scanning signal SEL, the voltage VLa of the first power line La becomes Vdd. As a result, as shown in FIG. 8(c), a path of the driving current holed from the first power line La toward the cathode of the organic EL element OLED is formed. On the assumption that the driving transistor T3 operates in a saturation region, the driving current Ioled flowing through the organic EL element OLED is calculated by means of the following equation 5.

$$Ioled = Ids = \beta/2(Vgs - Vth2)^2 \quad \text{(Equation 5)}$$

Here, if V1 calculated by means of Equation 1 is substituted for the gate voltage Vg of the driving transistor T3, Equation 5 is transformed into the following equation 6.

$$Ioled = \beta/2(Vg - Vs - Vth2)^2 = \beta/2\{(Vss + Vth1 + \alpha \cdot \Delta Vdata) - Vs - Vth2\}^2 \quad \text{(Equation 6)}$$

In the present embodiment, the threshold value Vth1 of the compensating transistor T2 and the threshold value Vth2 of the driving transistor T3 are set to be almost the same. Therefore, in Equation 6, since Vth1 and Vth2 are offset, Equation 6 can be completed as the following equation 7. As seen from Equation 7, the organic EL element OLED emits based on the driving current holed which does not depend on the threshold value Vth1 and Vth2 of the transistor T2 and T3, such that the grayscale of the pixel 2 is set.

$$Ioled = \beta/2(Vss + \alpha \cdot \Delta Vdata - Vs)^2 \quad \text{(Equation 7)}$$

In such a manner, according to the present embodiment, when the Vth compensation is performed, a reverse bias is applied to both of the compensating transistor T2 and the driving transistor T3. Thus, similar to the first embodiment, it is possible to perform the Vth compensation and the suppression of Vth shift in the same operation process (the initializing period t0 to t1), and it also is possible to enhance the flexibility of operational design.

Moreover, in the present embodiment, by the same reason in the second embodiment, a reverse bias period t2' to t3 may be provided during a second half of the driving period t2 to t3, and during the period t2' to t3, the voltages VLa and VLb of the power lines La and Lb may be set to Vrvs.

Further, the driving transistor T3 and the compensating transistor T2 may not be coupled to the different power lines La and Lb respectively, but may be coupled to the same power line. In other words, the voltage level of one terminal of two terminals of the compensating transistor T2 with a channel region interposed therebetween may be set to be the same as the voltage level of one terminal of two terminals of the driving transistor T3 with a channel region interposed therebetween. Thus, it is possible to reduce the number of wiring lines per one pixel circuit.

It is preferred that a period in which the compensating transistor T2 is in the on-state partially overlaps with a part of a period in which the first switching transistor T1 is in the on-state and voltage Vx of the data line X is set to a predetermined level (for example, Vss) during at least a part of the overlapping period in which both of the first switching transistor T1 and the compensating transistor T2 are in the on-states as shown FIG. 7. Herewith the potential of one electrode of the capacitor C1 that forms capacitance with the other electrode of the capacitor C1 coupled to the Node N1 can be precisely determined when the offset level is stored. Moreover setting of the voltage level of the Node N1 by the capacitive coupling via the capacitor C1 when the data voltage Vdata is supplied can be precisely performed.

4. Fourth Exemplified Embodiment

FIG. 9 is a diagram of a voltage follower type voltage-programmed mode pixel circuit according to the present embodiment. As regards the pixel circuit, one scanning line Y shown in FIG. 1 includes four scanning lines Ya to Yd to which scanning signals SEL1 to SEL4 are respectively supplied, and one power line L shown in FIG. 1 includes two power line La and Lb. One pixel circuit has an organic EL element OLED, five n-channel type transistors T1 to T5 and two capacitor C1 and C2 each storing data. The pixel circuit is based on the pixel circuit shown in FIG. 2, and has two additional transistors T4 and T5.

More specifically, the gate of the first switching transistor T1 is coupled to the first scanning line Ya to which the first scanning signal SEL1 is supplied. One terminal of the transistor T1 is coupled to the data line X, and the other terminal thereof is coupled to one electrode of the first capacitor C1. The other electrode of the capacitor C1 is coupled to the node N1. To the node N1, other than the first capacitor C1, the gate of the driving transistor T3, one terminal of the second switching transistor T2 and one electrode of the second capacitor C2 are commonly coupled. One terminal of the driving transistor T3 is coupled to the first power line La, and the other terminal thereof is coupled to the node N2. To the node N2, other than the driving transistor T3, the other terminal of the second switching transistor T2, the other electrode of the second capacitor C2, one terminal of a third switching transistor T4 and the anode of the organic EL element OLED via a fourth switching transistor T5 are commonly coupled. To the cathode of the organic EL element OLED, the reference voltage Vss is fixedly applied. The second capacitor C2 is provided between the gate of the driving transistor T3 and the node N2, such that a voltage follower type circuit is constructed. The second switching transistor T2 is provided in parallel to the second capacitor C2, whose gate is coupled to the second scanning line Yb to which the second scanning signal SEL2 is supplied. The other terminal of the third switching transistor T4 is coupled to the second power line Lb, and a gate of the third switching transistor T4 is coupled to a third scanning line Yc to which a third scanning signal SEL3. Further, a gate of the fourth switching transistor T5 is coupled to a fourth scanning line Yd to which a fourth scanning signal SEL4 is supplied.

Figure 10:
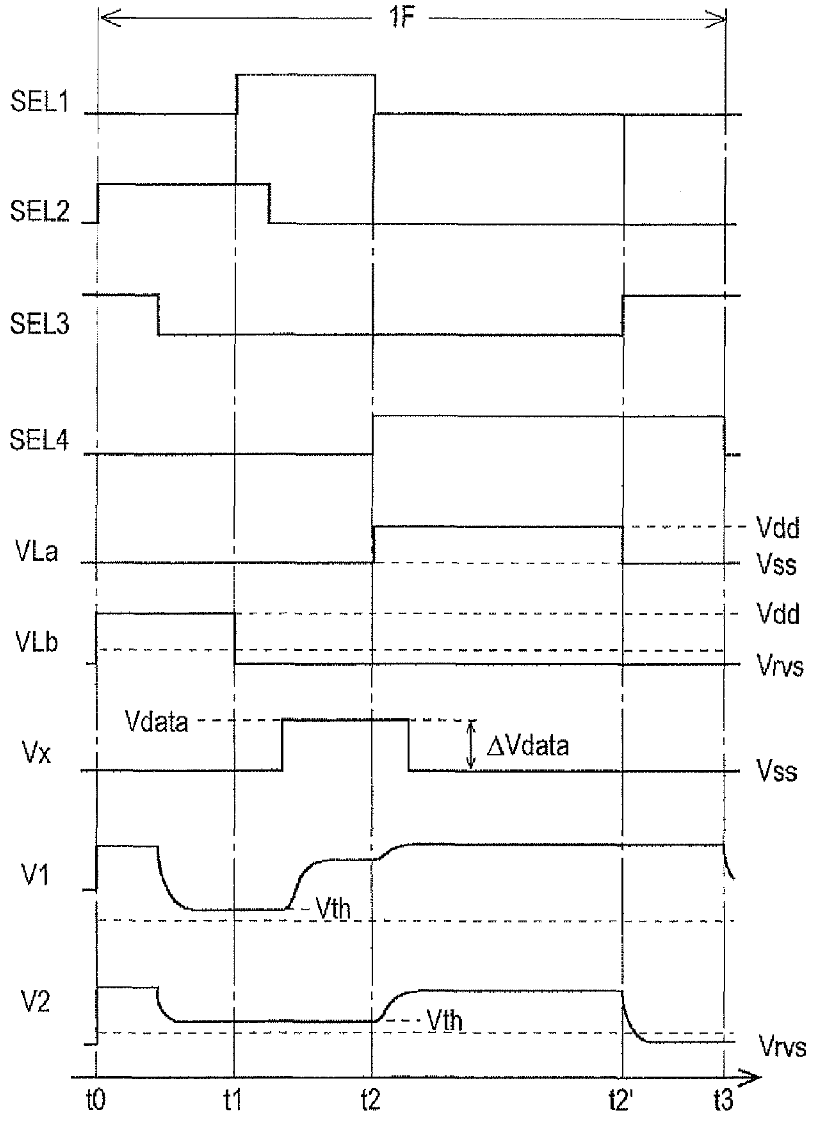
FIG. 10 is an timing chart of operation according to the fourth exemplified embodiment.

FIG. 10 is a flow chart of operation of the pixel circuit shown in FIG. 9. In the present embodiment, a period t0 to t3 corresponding to one frame period 1F, includes a reverse bias period t2' to t3 during which a reverse bias is applied to the organic EL element OLED, in addition to an initial period t0 to t1, a data writing period t1 to t2 and a driving period t2 to t2'.

During the initializing period t0 to t1, application of a reverse bias and Vth compensation to the driving transistor T3 are simultaneously performed. More specifically, if the scanning signals SEL1 and SEL4 become L level, the switching transistors T1 and T5 are turned off together. Thus, the first capacitor C1 and the data line X are electrically isolated from each other, and the organic EL element OLED and the node N2 are electrically isolated from each other. Further, if the second scanning signal SEL2 becomes H level, the second switching transistor T2 is turned on. In addition, during a part (first half) of the initializing period t0 to t1, the third scanning signal SEL3 becomes H level, and the third switching transistor T4 is turned on. Here, a voltage VLa of the first power line La is set to Vss, and a voltage VLb of the second power line Lb is set to Vdd. From such a voltage relation, to the driving transistor T3, a reverse bias against the driving current baled is applied, and the driving transistor T3 is diode-connected in which the gate and the drain (a terminal thereof on the node N2 side) of the driving transistor T3 are forwardly coupled to each other. Subsequently, if the third scanning signal SEL3 falls to L level and the third switching transistor T4 is turned off, the voltage V2 of the node N2 (and the voltage V1 of the node N1 directly coupled to the node N2) is set to the offset level (Vss+Vth). The capacitors C1 and C2 coupled to the node N1 are set to such a charge state that the voltage V1 of the node N1 becomes the offset level (Vss+Vth), prior to the data writing.

In the data writing t1 to t2, the data writing to the capacitors C1 and C2 is performed based on the offset level (Vss+Vth) set during the initializing period t0 to t1 More specifically, if the second scanning signal SEL2 falls to L level and the second switching transistor T2 is turned off, diode-coupling of the driving transistor T3 is released. In synchronization with the falling of the scanning signal SEL2, the first scanning signal SEL1 rises to H level, and the first switching transistor T1 is turned on. Thus, the data line X and the first capacitor C1 are electrically coupled to each other. Then, at a point of time after predetermined time from the timing t1 has lapsed, the voltage Vx of the data line X rises from the reference voltage Vss to the data voltage Vdata. By means of capacitive coupling via the first capacitor C1, the voltage V1 of the node N1 rises by $\alpha \cdot \Delta$Vdata based on the offset level (Vss+Vth), and data according to the voltage V1 of the node N1 are written in the capacitors C1 and C2. Moreover, during the period t1 to t2, since the fourth switching transistor T5 is turned off, the driving current Ioled does not flow, such that the organic EL element OLED does not emit.

During the driving period t2 to t2', the first scanning signal SEL1 falls to L level, and the first switching transistor T1 is turned off. Then, in synchronization with the falling of the first scanning signal, the fourth scanning signal SEL4 rises to H level, the fourth switching transistor T5 is turned on, and the voltage VLa of the first power line La becomes Vdd. Thus, the driving current Ioled flows through the organic EL element OLED, such that the organic EL element OLED emits. By the reason as described above, the driving current bled does not nearly depend on the threshold value Vth of the driving transistor T3.

During the reverse bias period t2' to t3, the third scanning signal SEL3 rises to H level and the voltage VLa of the first power line La falls from Vdd to Vss. Further, during the period t2' to t3, the voltage VLb of the second power line Lb is Vrvs. Therefore, since the voltage Vrvs of the second power line Lb is directly applied to the node N2 and V2 becomes Vrvs, a reverse bias is applied to the organic EL element OLED.

According to the present embodiment, similar to the respective embodiments described above, it is possible to perform Vth compensation and suppression of Vth shift in the same operation process (the initializing period t0 to t1) and to enhance the flexibility of operational design. Further, during the reverse bias period t2' to t3, since the reverse bias is applied to the organic EL element OLED, it is possible to lengthen the life span of the organic EL element OLED.

5. Fifth Exemplified Embodiment

FIG. 11 is a diagram of a voltage-programmed mode pixel circuit according to the present embodiment. The pixel circuit is not a voltage follower type, unlike the respective embodiments described above. One pixel circuit is comprised of an organic EL element OLED, three n-channel type transistors T1 to T3 and a capacitor C1 storing data.

A gate of the first switching transistor T1 is coupled to the first scanning line Ya to which the first scanning signal SEL1 is supplied. One terminal of the transistor T1 is coupled to the data line X and the other terminal thereof is coupled to one electrode of the first capacitor C1, The other electrode of the capacitor C1 is coupled to a node N1. To the node N1, other than the first capacitor C1, a gate of the driving transistor T3 and one terminal of the second switching transistor T2 are commonly coupled. One terminal of the driving transistor T3 is coupled to a power line L and the other terminal thereof is coupled to the node N2. To the node N2, other than the driving transistor T3, an anode of the organic EL element OLED and the other terminal of the second switching transistor T2 are commonly coupled. To a cathode of the organic EL element OLED, a reference voltage (for example, 0 V) lower than a power voltage Vdd is fixedly applied. A gate of the second switching transistor T2 is coupled to the second scanning line Yb to which the second scanning signal SEL2 is supplied.

Since the operation of the pixel circuit is as shown in the timing chart of FIG. 3, and it is the same as the first embodiment except that the second capacitor C2 is not provided, the description will be omitted.

According to the present embodiment, even in the voltage-programmed mode pixel circuit which is not a voltage follower type, it is possible to perform Vth compensation and suppression of Vth shift in the same operation process (the initializing period t0 to t1). As a result, it is possible to enhance the flexibility of operational design in such a pixel circuit.

Moreover, in the above-mentioned embodiments, an example in which an organic EL element OLED is used for an electro-optical device has been described. However, the present invention is not limited to the organic EL element OLED, but may be widely applied to an electro-optical device (an inorganic LED display device, a field emission display device or the like) whose brightness is set according to the driving current, or an electro-optical device which exhibits transmittance and reflectance according to the driving current (an electrochromic display device, an electrophoretic display device or the like).

In addition, the present invention has a feature that Vth compensation of the driving transistor and application of a reverse bias to the driving transistor are performed in the same operation process. Therefore, the concept of the present invention can be widely applied to electronic circuits other than the electro-optical devices, for example, apparatuses in which various sensing is performed with high sensitivity, such as a fingerprint sensor disclosed in Japanese Unexamined Patent Application Publication No. 8-305832 or a bio chip disclosed in Japanese Patent Application No. 2003-107936, which is earlier filed by the applicant. The basic configuration of the electronic circuit is the same as the pixel circuits according to the respective embodiments described above, except that the electro-optical element (the organic EL element OLED) is substituted with a current detection circuit. As regards the operation of the electronic circuit, first, the gate and one terminal of the driving transistor are coupled to each other and a non-forward bias is applied to the driving transistor. Thus, the voltage of a node coupled to the gate of the driving transistor is set to an offset voltage (Vss+Vth). Next, a voltage from a variable voltage source is supplied to a data line which is capacitively coupled to the node, and then data writing based on the offset voltage (Vss+Vth) is performed to a capacitor coupled to the node. Then, a forward bias is applied to the driving transistor to generate a current according to data stored in the capacitor, and to supply the current detection circuit with the current. The current detection circuit measures the amount of the current flowing through the driving transistor.

In addition, the present invention has a feature that Vth compensation of the driving transistor and application of a reverse bias to the driving transistor are performed in the same operation process. Therefore, the concept of the present invention can be widely applied to electronic circuits other than the electro-optical devices, for example, apparatuses in which various sensing is performed with high sensitivity, such as a fingerprint sensor disclosed in Japanese Unexamined Patent Application Publication No. 8-305832 or a bio chip disclosed in Japanese Unexamined Patent Application Publication No. 2003-107936, which is earlier filed by the applicant. The basic configuration of the electronic circuit is the same as the pixel circuits according to the respective embodiments described above, except that the electro-optical element (the organic EL element OLED) is substituted with a current detection circuit. As regards the operation of the electronic circuit, first, the gate and one terminal of the driving transistor are coupled to each other and a non-forward bias is applied to the driving transistor. Thus, the voltage of a node coupled to the gate of the driving transistor is set to an offset voltage (Vss+Vth). Next, a voltage from a variable voltage source is supplied to a data line which is capacitively coupled to the node, and then data writing based on the offset voltage (Vss+Vth) is performed to a capacitor coupled to the node. Then, a forward bias is applied to the driving transistor to generate a current according to data stored in the capacitor, and to supply the current detection circuit with the current. The current detection circuit measures the amount of the current flowing through the driving transistor.

What is claimed is:

1. A method of driving an electronic circuit having a plurality of pixel circuits, each pixel circuit including driving transistor having a gate, a first terminal, a second terminal, a channel region arranged between the first terminal and the second terminal, a driven element, and a first transistor connected between the gate of the driving transistor and the first terminal, the method comprising:

generating a first potential difference between the first terminal and the second terminal such that the first terminal functions as a drain of the driving transistor in a state in which the gate of the driving transistor and the first terminal are made conductive by the first transistor being in a conductive state;

supplying a data signal to the gate of the driving transistor during a state in which the gate and the first terminal are not made conductive by the first transistor being in a non-conductive state;

generating, in a state in which the gate of the driving transistor and the first terminal are not made conductive by the first transistor being in the non-conductive state, a second potential difference between the first terminal and the second terminal such that the second terminal functions as the drain of the driving transistor; and supplying to the driven element one of a drive voltage and a drive current corresponding to an electrical conduction state of the driving transistor set by the data signal, each pixel circuit further including a first electrode, a second electrode, and a capacitor by which a capacitance is formed between the first electrode and the second electrode, the gate of the driving transistor being connected to the first electrode, after the generating of the first potential difference, the gate of the driving transistor being in a floating state, the data signal being supplied to the gate of the driving transistor by capacitive coupling through the capacitor, and the conduction state being set, the driven element including an operation electrode connected to the first terminal, an opposite electrode, and a function layer arranged between the operation electrode and the opposite electrode, and at least a voltage of the opposite electrode being fixed at a predetermined voltage level while the generating of the first potential difference and the second potential difference are being executed.

2. The method of driving an electronic circuit as set forth in claim 1, at the time of generating the first potential difference, an initialized current flowing from the first terminal toward the second terminal, and a gate voltage of the driving transistor being set to an offset level corresponding to a threshold value of the driving transistor.

3. The method of driving an electronic circuit as set forth in claim 1, a voltage level of the second terminal being set to be lower than the predetermined voltage level during at least a portion of the generating of the first potential difference.

4. The method of driving an electronic circuit as set forth in claim 1, further comprising:

setting a first terminal voltage level lower than the predetermined voltage level, and fixing the voltage of the opposite electrode to the predetermined voltage level during the setting of the first terminal voltage level.

5. The method of driving an electronic circuit as set forth in claim 1, a power source line being provided that supplies a voltage to the second terminal, and the voltage supplied by the power source line being different during the generating of the first potential difference than during the generating of the second potential difference.

6. An electronic circuit that drives a plurality of driven elements, the electronic circuit comprising:

a plurality of pixel circuits, each pixel circuit including:

a driving transistor having a gate, a first terminal, a second terminal, and a channel region between the first terminal and the second terminal; and a first transistor connected between the first terminal and the gate of the driving transistor that controls an electrical connection between the first terminal and the gate of the driving transistor, during at least part of a first period in which the first terminal and the gate of the driving transistor are electrically connected through the first transistor being in a conductive state, a voltage level of at least one of the first and second terminals being set such that the first terminal functions as a drain of the driving transistor, during at least part of a second period in which the first terminal and the gate of the driving transistor are electrically disconnected, a voltage level of at least one of the first and second terminals being set such that the second terminal functions as a drain of the driving transistor, each pixel circuit further including a first electrode, a second electrode, and a capacitor by which a capacitance is formed between the first electrode and the second electrode, the gate of the driving transistor being connected to the first electrode, after generating a first potential difference, the gate of the driving transistor being in a floating state, a data signal being supplied to the gate of the driving transistor by capacitive coupling through the capacitor, and a conduction state being set, the driven element including an operation electrode connected to the first terminal, an opposite electrode, and a function layer arranged between the operation electrode and the opposite electrode, and at least a voltage of the opposite electrode being fixed at a predetermined voltage level while the generating of the first potential difference and a second potential difference are being executed.

7. The electronic circuit as set forth in claim 6, at the time of the first period, a voltage level of the gate of the driving transistor being set to an offset level corresponding to a threshold value voltage of the driving transistor, and during at least a portion of the second period, a drive voltage or a drive current corresponding to the conduction state of the driving transistor being supplied to the driven elements.

8. The electronic circuit as set forth in claim 6, further comprising:

a third terminal; and a fourth terminal, a voltage level of one of the fourth terminal and the third terminal being set at the same voltage level as the second terminal through the first and second periods.

9. An electronic device, comprising:

the electronic circuit as set forth in claim 6.

10. An electro-optical device, comprising:

a plurality of data lines;

a plurality of scanning lines;

a plurality of first power source lines; and a plurality of pixel circuits arranged according to intersections of the plurality of data lines and the plurality of scanning lines;

each of the plurality of pixel circuits including:

an electro-optical element;

a driving transistor having a gate, a first terminal, a second terminal, and a channel region arranged between the first terminal and the second terminal, and a first switching transistor connected between the first terminal and the gate of the driving transistor that controls an electrical connection between the first terminal and the gate of the driving transistor, a conduction state of the driving transistor being set according to a data signal supplied through one data line of the plurality of data lines, a drive voltage or a drive current corresponding to the conduction state of the driving transistor being supplied to the electro-optical element, during at least part of a period in which the first terminal and the gate of the driving transistor are electrically connected through the first switching transistor being in a conductive state, a voltage level of at least one of the first terminal and the second terminal being set such that the first terminal functions as a drain of the driving transistor, during at least part of a period in which the drive voltage or the drive current is supplied to the electro-optical element, a voltage level of at least one of the first terminal and the second terminal being set such that the second terminal functions as the drain of the driving transistor, each pixel circuit further including a first electrode, a second electrode, and a first capacitor by which a capacitance is formed between the first electrode and the second electrode, the gate of the driving transistor being connected to the first electrode, after generating a first potential difference, the gate of the driving transistor being in a floating state, the data signal being supplied to the gate of the driving transistor by capacitive coupling through the first capacitor, and the conduction state being set, a driven element including an operation electrode connected to the first terminal, an opposite electrode, and a function layer arranged between the operation electrode and the opposite electrode, and at least a voltage of the opposite electrode being fixed at a predetermined voltage level while the generating of the first potential difference and a second potential difference are being executed.

11. The electro-optical device as set forth in claim 10, each of the plurality of pixel circuits further including:

a second switching transistor that controls an electrical connection between the one data line and the second electrode, during at least part of a period in which the first terminal functions as the drain of the driving transistor, an initialized current flowing between the first and second terminals, and the gate of the driving transistor being set to an offset level corresponding to a threshold value of the driving transistor, and after the offset level is set, the gate voltage of the driving transistor being set to a voltage level corresponding to the offset level and the data signal by capacitive coupling, through the first capacitor, of the data signal supplied through the second switching transistor.

12. The electro-optical device as set forth in claim 10, each of the plurality of pixel circuits further including:

a third electrode;

a fourth electrode; and a second capacitor by which a capacitance is formed between the third electrode and the fourth electrode, the third electrode being connected to the gate of the driving transistor, and the fourth electrode being connected to the first terminal.

13. The electro-optical device as set forth in claim 10, the second terminal being connected to one power source line of the plurality of power source lines, and the one power source line being able to be set at a plurality of voltage levels.

14. The electro-optical device as set forth in claim 10, the plurality of power source lines extending in a direction crossing the plurality of data lines.

15. The electro-optical device as set forth in claim 10, each pixel circuit having exactly three transistors.

16. An electronic device, comprising the electro-optical device as set forth in claim 10.

* * * * *